Dec. 28, 1965  R. E. STOODY  3,225,797
APPARATUS AND METHOD FOR STRAIGHTENING WIRE-LIKE OBJECTS
Filed June 11, 1962  6 Sheets-Sheet 1

Fig.1

INVENTOR.
RALPH E. STOODY
BY
Nelson E. Kimmelman
ATTORNEY

Dec. 28, 1965  R. E. STOODY  3,225,797
APPARATUS AND METHOD FOR STRAIGHTENING WIRE-LIKE OBJECTS
Filed June 11, 1962  6 Sheets-Sheet 2

INVENTOR.
RALPH E. STOODY
BY
Nelson E. Kimmelman
ATTORNEY

INVENTOR.
RALPH E. STOODY
BY
Nelson E. Kimmelman
ATTORNEY

Dec. 28, 1965    R. E. STOODY    3,225,797
APPARATUS AND METHOD FOR STRAIGHTENING WIRE-LIKE OBJECTS
Filed June 11, 1962    6 Sheets-Sheet 5

INVENTOR.
RALPH E. STOODY
BY
Nelson E. Kimmelman
ATTORNEY

United States Patent Office 3,225,797
Patented Dec. 28, 1965

3,225,797
APPARATUS AND METHOD FOR STRAIGHTENING WIRE-LIKE OBJECTS
Ralph E. Stoody, 370 Elkwood Terrace, Englewood, N.J.
Filed June 11, 1962, Ser. No. 206,534
7 Claims. (Cl. 140—147)

This invention relates to essentially electro-mechanical apparatus and in particular to a machine for arranging the leads of transistors and similar objects in a desired fashion.

Today transistors are made by the millions and competition between the various manufacturers has forced prices down by a considerable extent so that it becomes more and more necessary to reduce the per unit cost of the transistors. While many of the industrial processes for their manufacture have been automated, including the very delicate steps of producing from the semiconductive material a base having the desired thickness, affixing the leads to the various conductivity sections, encapsulating the entire device, etc., there has been a notable lag in the mechanization of the steps required to finish off a transistor to ready it for its ultimate use. After a transistor has been made, its leads are usually awry and they must be straightened and arranged in a particular way. This is important if the transistors are sold in relatively small quantities, because the presence of transistors having crooked or skewed leads in the consumer packet may tend to repel a would-be buyer insofar as it suggests shoddy workmanship or fragility of the leads.

On the other hand, it is important to be able to produce transistors in great quantities whose leads are all uniform so that they may be directly applied to other machines which will, for example, insert them into printed circuit boards having holes arranged to receive the transistor leads. Alternatively, it may be necessary to straighten and arrange them so that they can be prepackaged in a form such that they can be fed in continuous magazines into the inserting machine. Unless the leads are straight and are arranged to fit the groupings of holes in the circuit board, much time and labor may be needlessly expended in arranging them manually to fit.

In still other instances, it is desired to process the leads of mass-produced transistors so that they have uniform lengths. To insure uniform lengths, it is first necessary to arange the leads of the transistors in a uniform position before subjecting them to a single uniform cutting action. At the present time, no single machine is known which will automatically accomplish this desired arrangement and straightening of the leads at today's production rates.

The objects of the present invention are therefore:
(1) To provide an automatic machine for arranging and straightening elongated, yieldable members attached to solid bodies, such as transistors and the like.
(2) To provide automatic machinery for high speed arrangement and straightening of transistor leads.
(3) To provide automatic machinery for arranging and straightening out twisted leads of transistors and the like to prepare them for insertion into printed circuit boards, for example.
(4) To provide a novel machine for separating, aligning and straightening elongated, yieldable members attached to solid bodies such as transistors, or the like.

These and other objects of the invention, which will occur to those skilled in the art upon reading the following specification and claims, and upon inspection of the drawings herein, are accomplished by providing, in accordance with my invention: (1) a processing channel into which the transistors are inserted and periodically transported, (2) a laterally moving lead-separating device, (3) an aligning claw which engages the leads where they were separated and moves downward to align the leads in predetermined positions and (4) jaw members which grasp the leads individually near the bottom of the transistor and move downward thereby removing all kinks, bends, etc. in the leads. An additional feature of my invention is to provide, if desired, a device for pressing the leads into substantially a single plane before they are subjected to the separating device.

*Brief overall description*

Figure 1:
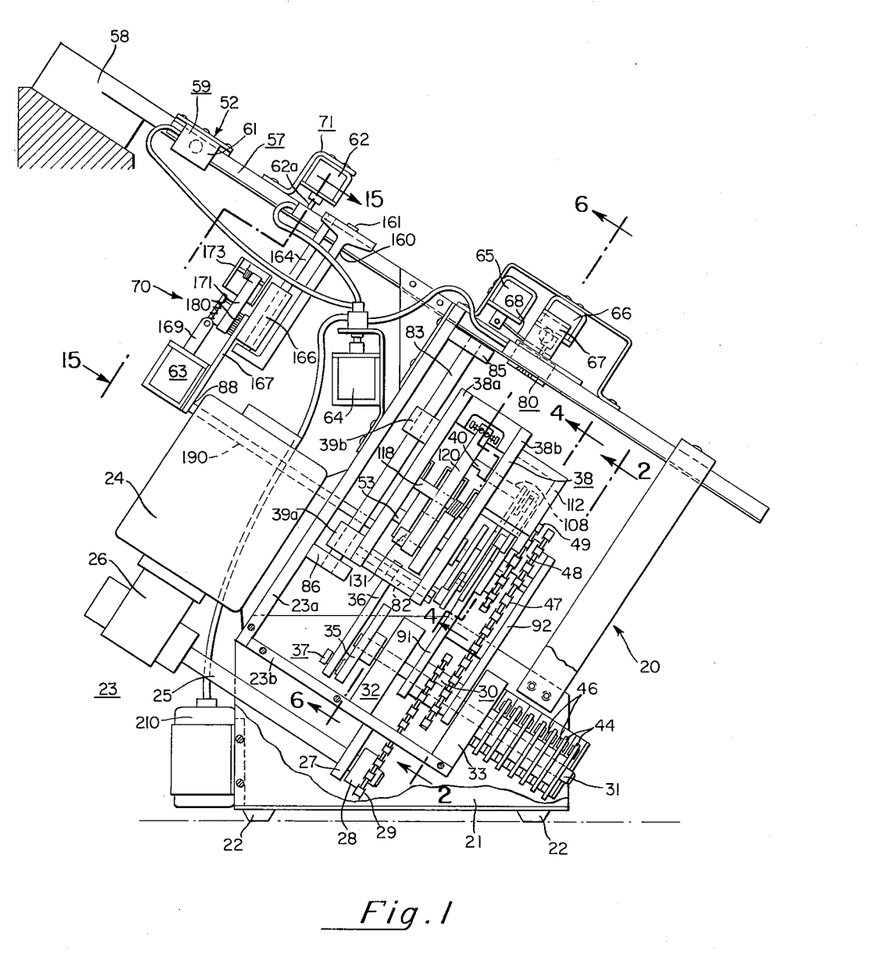
FIGURE 1 is a side elevation view of the apparatus constructed according to my invention.

Referring principally to FIGURE 1, there is shown a transistor lead straightening machine indicated generally at the numeral 20. Its base 21 rests upon feet 22 and includes a housing indicated generally at the numeral 23. Affixed to the outside of the panel 23a of the housing is a motor 24 which drives a rotating shaft 25 by gears indicated generally at the numeral 26. The shaft 25 passes through an aperture in a bracket 27 and at its right end a sprocket 28 is fixedly mounted to engage a chain 29. The chain 29 passes through an opening in the bottom member 23b of the housing (see FIGS. 2 and 3) and is also threaded around one sprocket 30a of a double sprocket member 30. The double sprocket member 30 is fixedly attached to a shaft 31 which passes through coaxially aligned apertures in mounting brackets 32 and 33 which are fixedly mounted perpendicular to the bottom housing member 23b.

Figures 11, 12, 13, 14:
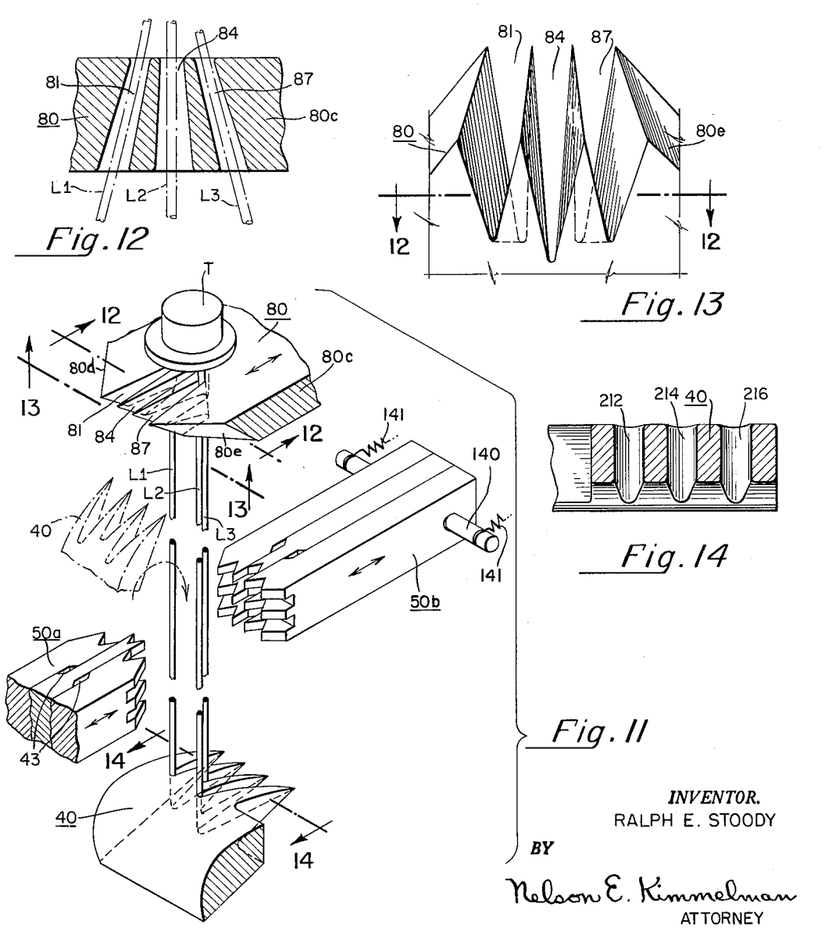
FIGURE 11 is an enlarged isometric view illustrating the movements of the separating, aligning and straightening elements of the invention.
FIGURE 12 is a sectional view of the separating element taken along the section line 12—12 of FIG. 11 in the direction indicated by the associated arrows.
FIGURE 13 is a view of the separating element as seen from the bottom of the separating element shown (section line 13—13) in FIGURE 11.
FIGURE 14 is a sectional view of the aligning comb taken along the section line 14—14 of FIG. 11 in the direction indicated by the arrows.

Rotation of the shaft 31 by chain 29 accomplishes three main purposes. First, it causes cyclic raising and lowering of a carriage sub-assembly 38 which includes an aligning comb 40 (FIG 11) and opposed sets of jaws 50a and 50b (FIG. 11). It accomplishes this by driving a disc 35 which is fixedly mounted to its left end, which in turn causes a rigid member 36 (FIG. 6) pivotally mounted thereto to move up and down. The movement of the rigid member 36 up and down, in turn, moves the carriage 38 up and down guided by shafts 83 and 84 which pass through apertured blocks 39a, 39b and 39c (see also FIG. 6) which are attached to carriage wall 38a. The end of the shafts 83 and 84 are set in apertured projections 85 and 86 which are perpendicularly disposed on the inside of the front housing wall 23a.

Second, rotation of the shaft 31 causes the double sprocket 30 to drive chain 47 which, in turn, drives another double sprocket assembly indicated generally at the numeral 48. Revolution of double sprocket 48 drives still another chain 49 which in turn, drives a sprocket 51 (FIG. 2) which is fixedly mounted upon shaft 53. As will be explained in detail below, rotation of the shaft 53, which passes through carriage 38, also causes movement of cams 96 and 114 mounted thereon (FIG. 4) which in turn drives linkage members that move the aligning comb 40 in an arcuate path (FIG. 11) as it is moved up and down with the carriage 38.

Third, rotation of shaft 31 also causes a number of parallel cams 44 mounted fixedly thereupon to rotate thereby actuating respective cam-follower-switches 46 that actuate solenoids (whose purpose will be explained later) which are numbered 61, 62, 63, 64, 65, 66 and 67.

Transistors T whose leads L1, L2 and L3 (FIG. 11) are to be straightened are fed into the channel 56 (FIG. 3) of feed channel member 57 from a feeder 58 which may be, for example, a conventional vibratory feeder or any other kind of automatic feeding apparatus. As individual transistors are fed from feeder 58 they are halted by an arrest sub-assembly indicated generally at the numeral 59 whence they are intermittently permitted to pass, one-by-one, to a second arrest sub-assembly indicated generally at the numeral 71. At this point, there is located a pre-straightener sub-assembly indicated generally at the numeral 70, which is connected to carriage 38 by shaft 190. The pre-straightener 70 moves up in conjunction with the carriage 38, grasps the depending leads L1, L2 and L3 of the transistor T at sub-assembly 71 within two opposing resilient pads 186 and 188 (FIG. 16) and presses them in one plane while the sub-assembly is lowered in unison with the carriage 38. (While the pre-straightener 71 is operating, the separating, aligning and straightening elements associated with the carriage 38 are simultaneously operating on the transistor (if any) located at the third arrest point which is located above the carriage 38.)

After the pre-straightener 70 has operated on the transistor T, the latter moves further down channel 56 until it is stopped at a third arrest point by the action of solenoid 66 and then its top is clamped into fixed position by apparatus connected with the solenoid 65. At this juncture, a separator 80 (FIG. 11) moves under the influence of solenoid 67 within its own plane extremely close to the point where the leads L1, L2 and L3 are attached to the bottom of the transistor and forces the leads apart there. Then the teeth of the aligning comb 40 (FIG. 11) move between the leads L1, L2 and L3 very close to where the separator acted and then moves downward out of the way of the lower surfaces of the opposed jaws 50a and 50b. These jaws have moved toward one another to grasp each of the aligned leads near the bottom of the transistor T. The jaws are closed and they and the comb then move downward together as the carriage 38 is lowered, the comb preceding the jaws by a small distance. If the comb 40 were not used, leads that were separated in one place by the separator might spring back to their original widely spread-out state due to their resilience. Thus, they might not go into the V-notched grooves of the jaws 50a and 50b. The comb 40 acts to separate the leads L1, L2 and L3 throughout the rest of their lengths, tends to align their axes parallel to one another and lays each lead in to the proper groove in the jaws 50a and 50b. After these operations have been completed, the solenoid 66 is again actuated to permit the processed transistor to proceed further down the feed channel 56, either to be discharged from the machine or possibly to be applied to auxiliary apparatus such as a lead-cutter (not shown).

*Driving mechanism—Carriage movement*

Figure 2:
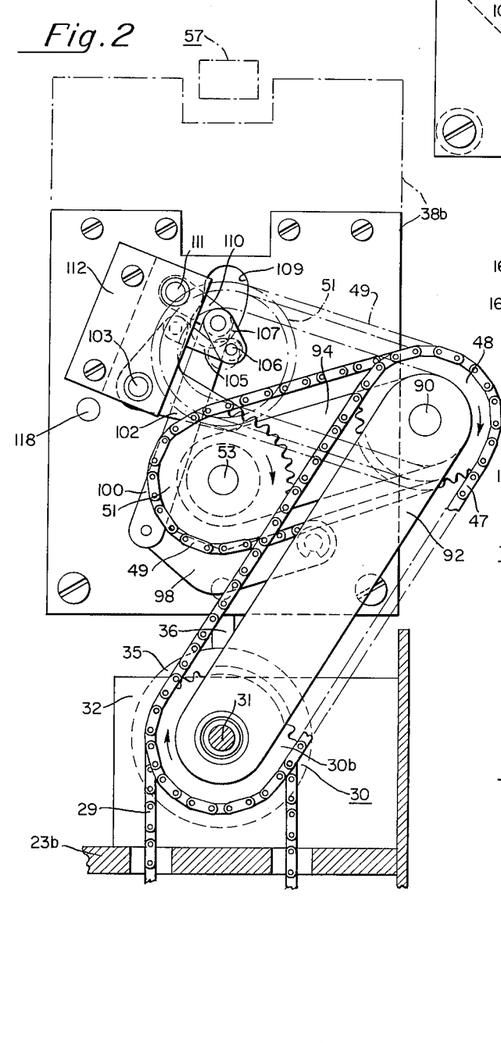
FIGURE 2 is a partly sectional, rear elevation view of the appratus taken along the section line 2—2 of FIG. 1 in the direction indicated by the associated arrows.
Figure 3:
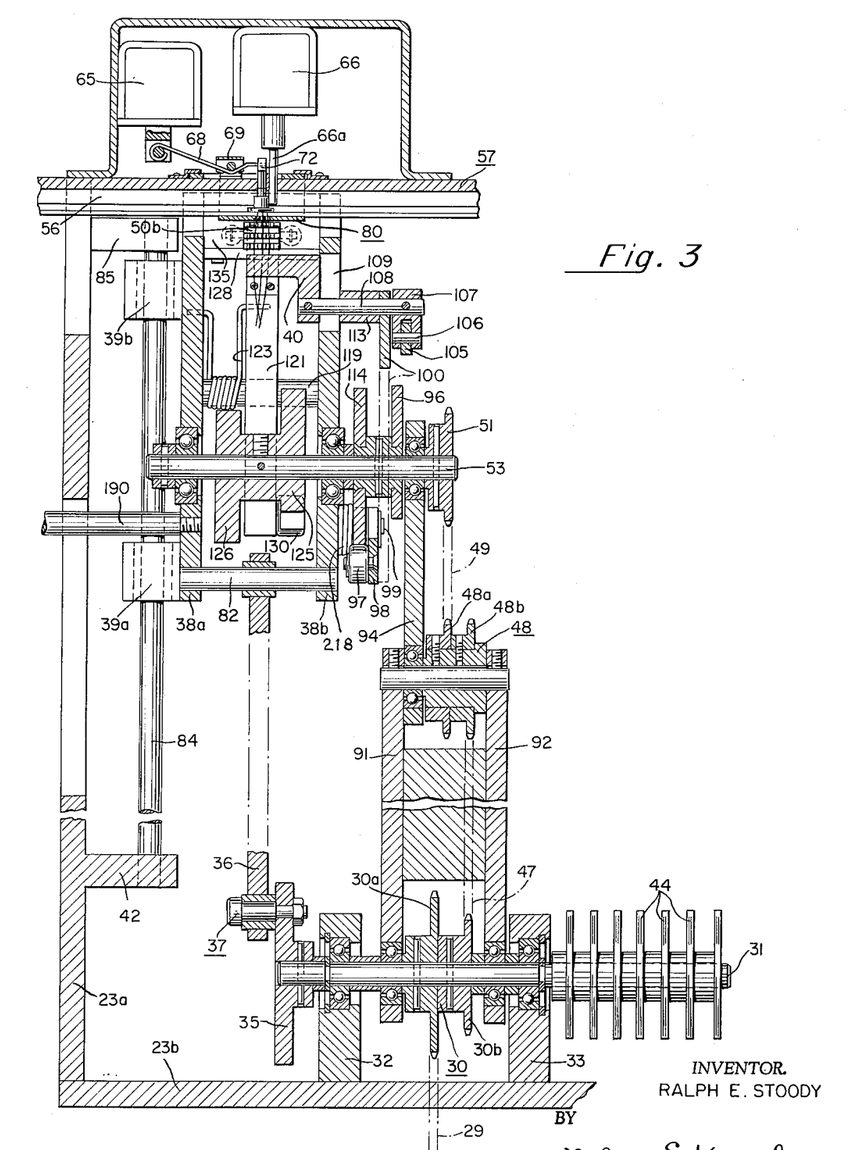
FIGURE 3 is a partly sectional view of the apparatus taken along the section line 3—3 of FIG. 2 in the direction indicated by the associated arrows.

Referring now to FIGS. 1, 2, and 3 especially, details of the driving mechanism will now be considered.

The driving mechanism may be considered to comprise the shaft 31 which performs driving and control functions, and the shaft 53 which is driven, through intermediate linkage, by the shaft 31. The shaft 53, in turn, actuates the aligning comb 40 and the jaws 50a and 50b.

As stated above, operation of the motor 24 causes the shaft 25 and the chain 29 to revolve whereupon the shaft 31 is also caused to revolve because of the double sprocket 30 fixedly mounted thereto. The shaft 31 is supported by bearings mounted within transverse aligned apertures in the brackets 32 and 33 respectively. On the left side of bracket 32, a disc 35 is fixedly mounted to the left end of the shaft 31. This disc 35 (FIG. 6) is coupled to a rigid connecting arm 36 by a pivot bolt and nut subassembly indicated generally at the numeral 37. The assembly 37 passes through a slightly larger aperture at the lower end of connecting arm 36 thereby allowing the member 36 some rotary motion as the disc 35 revolves. The member 36 also has an aperture near its upper end through which a slightly smaller pivot pin or shaft 82 passes and is lodged at each end in the carriage plates 38a and 38b. Thus, the member 36 can also pivot somewhat about the shaft 82 as the disc 35 moves it up and down, yet it transmits the vertical component of motion of the disc 35 to move the carriage accordingly.

On the outside of the plate 38a are three blocks 39a, 39b and 39c which are fixedly mounted to the plate 38a and which have apertures therein through which shafts 83 and 84 (FIG. 6) pass. The ends of the shafts 83 and 84 are fixed within inwardly projecting mounting members 85 and 86 which may be formed integral with the housing member 23a or may be mounted fixedly thereto. It will be seen that when the rigid member 36 moves upward, the entire carriage 38 rides upward on the two shafts 83 and 84. It will be remembered that this carriage 38 includes the aligning comb 40 and the lead-straightening die jaws 50a and 50b which perform two important steps in the operation of this machine. Both of these steps require downward movement after the aligning comb and the die-jaws have respectively engaged the leads.

It will also be seen that the pre-straightener subassembly 70 moves up and down with the carriage 38 because there is a shaft 190 connected between it and the left plate 38a.

*Driving mechanism—Comb movement*

The shaft 31, in addition to moving the carriage 38 and the pre-straightener 70 up and down simultaneously, causes the alignment comb 40 to move in a curved path (FIG. 11) first to engage the leads, and then to cause the die jaws 50a and 50b to engage the leads once the comb 40 has moved below the latter jaws in the course of its travel.

The details of the structure and operation of the machine whereby the alignment comb is moved in its curved path will now be explained with particular reference to FIGS. 2, 3, and 4. Rotation of the sprocket 30a (FIG. 3) causes the sprocket 30b to rotate and therefore causes the chain 47 to move accordingly. Movement of chain 47 causes the sprocket 48 to rotate in the same direction. Sprocket 48 which consists of two sprockets 48a and 48b is mounted for simultaneous movement about a shaft 90. Shaft 90 is fixedly mounted between the top ends of two opposing rigid members 91 and 92. The lower ends of the rigid members 91 and 92 have apertures in which are mounted bearings through which the shaft 31 passes. Also mounted for rotation about the shaft 90 is a rigid link 94 having an aperture in its lower end in which bearings are mounted which supports the shaft 90. The upper end of the rigid link 94 also has an aperture in which bearings are mounted and through which shaft 53 passes. A chain 49 connected to the sprocket 48a drives a sprocket 51 that is mounted to shaft 53 thereby causing the shaft 53 to rotate. The shaft 53 passes through bearings within coaxial apertures in the opposing carriage members 38a and 38b. It is thus seen that the drive coupling between the shaft 31 and the shaft 53 is jointed so as to permit the chain and sprocket to be effective notwithstanding the variations in the distance between shaft 31 and 53 while the carriage 38 is moving up and down.

Figure 4:
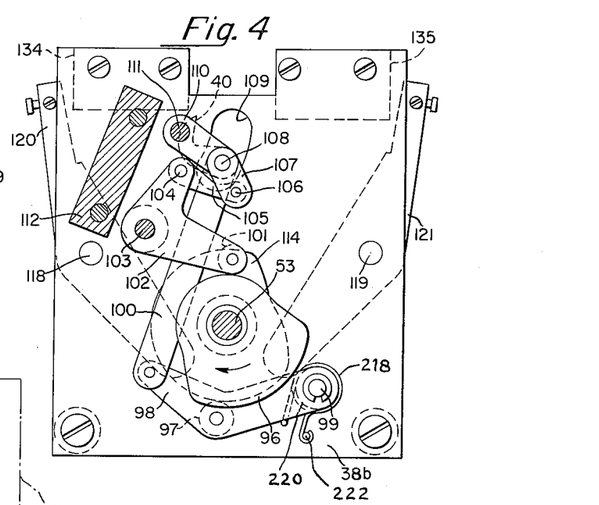
FIGURE 4 is a partly sectional and partly phantom view of part of the apparatus taken along the line 4—4 of FIG. 1 in the direction indicated by the arrows.
Figure 5:
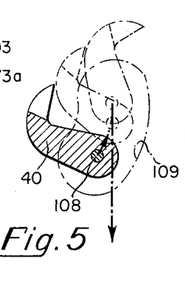
FIGURE 5 is a partly sectional and partly phantom view of the aligning comb sub-assembly shown in phantom in FIG. 4 which depicts its various movements.

The linkage responsive to rotation of shaft 53 which causes the curved motion of the comb 40 will now be considered particularly in connection with FIGS. 3 and 4. A cam 96 is fixedly mounted to rotate with the shaft 53. This cam is engaged by a cam-follower roller 101 which is at the lower end of an angled member 102. The member 102 pivots about a shaft 103 which is mounted between a bracket member 112 (FIGS. 2 and 4) and carriage wall 38b. Its upper end is pivotally coupled by means of a pivot 104 to a rigid linkage member 105. The latter member is itself pivotally coupled by pivot 106 to another rigid linkage member 107 which is generally U-shaped (FIG. 3). Member 107 is fixedly connected to a shaft 108 which passes through the link 100 and an apertured spacer 113. It also passes through the slot 109 and is fixed at its left end to the comb 40. Consequently, when the lower right end of the angled member 102 is riding with its follower roller 101 on the smaller radius portion of the cam 96, the comb 40 will be in the position illustrated in FIG. 4. However, when the roller 101 starts to ride on the larger radius portion of the cam 96, the lower right end of the member 102 will be urged in a counterclockwise direction causing its upper end portion to move similarly which thereupon pulls, via link 105, the lower part of the link 107 in a clockwise direction. As link 107 is connected fixedly to shaft 18 through an aperture in the member 110, which is fixed about shaft 111, the shaft 108 rotates in the clockwise direction and the comb 40 moves clockwise. One end of shaft 111 is fixed to carriage wall 38b, the other is journalled in bracket 112.

While the cam 96 is rotating in a clockwise direction, another cam 114, which is also fixed to the shaft 53, is rotating similarly. The cam 114 is engaged by a cam-follower roller 97 which is positioned intermediate two ends of another angled member 98. A biassing spring 218 is wound around hub 220 (FIG. 3) and has one end bent over member 98 and the other fixed against pin 222 (FIG. 4). The right end of member 98 is pivotally connected to the plate 38b by a pivot pin 99. Pivot pin 99 is mounted perpendicular to wall 38b and it has a smaller radius portion which passes through the end portion of member 98, a retaining washer being used to keep member 98 on the pin 99. The left end of the member 98 is pivotally connected to the lower end of the rigid member 100. The upper end of member 100 has an aperture somewhat larger than the diameter of the shaft 108 which passes through it so as to enable the member 100 to rotate somewhat about shaft 108 as it is moved by the angled member 98. Thus, as the shaft 53 rotates in a clockwise direction, the left end of the member 98 will be pushed down when the larger radium section of the cam 114 bears against the cam-follower roller 97. Hence, the member 100 will be pulled down also and so will the shaft 108 which is coupled to the comb 40. Simultaneously, the comb 40 will be rotated by rotation of the shaft 108. It should also be remembered that the entire carriage 38 is also being moved up and down so that the comb 40 really is moved in three directions.

*Driving mechanism—Straightening jaws*

Figures 6, 7, 7A, 8:
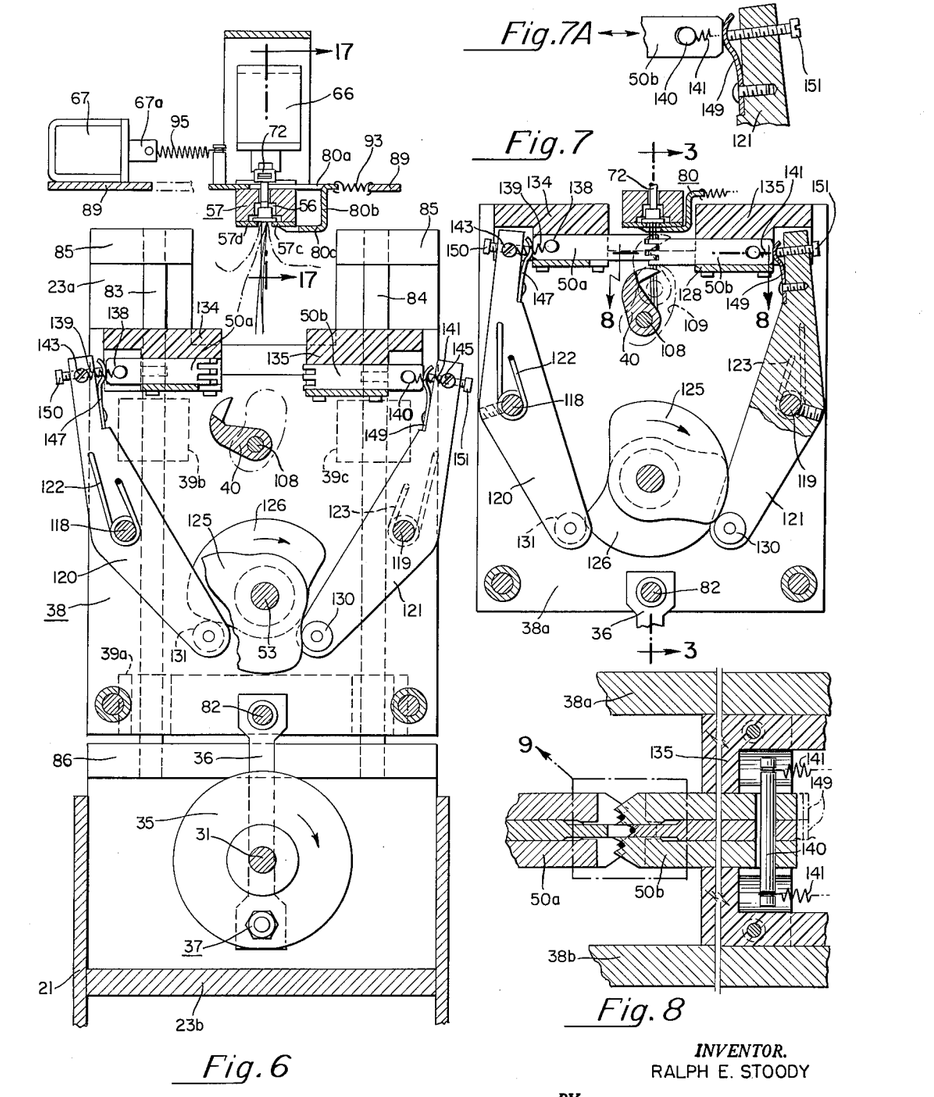
FIGURE 6 is a partly sectional view of the main straightening apparatus shown in FIG. 1 in a lower position and taken along the section line 6—6 in the direction indicated by the arrows.
FIGURE 7 is a fragmentary view similar to FIG. 6 showing in partly sectional form the operation of the straightening sub-assembly illustrated in FIG. 6 when its jaws are closed and the carriage is in its raised position.
FIGURE 7a is an enlarged detail of part of the jaw-drive sub-assembly shown in FIG. 7.
FIGURE 8 is a sectional view of part of the sub-assembly taken along the section line 8—8 of FIG. 7 in the direction indicated by the arrows.

It will be seen from inspection of FIGS. 3, 6, and 7 that there is also mounted upon the shaft 53 another cam assembly which comprises the cam 125 and the cam 126. Between the two cams are located two opposing die-jaw actuating members 121 and 120. The actuating member 120 has a central aperture through which a shaft 118 passes, whereas its opposite number, actuator 121 has a central aperture through which a shaft 119 passes. Both shafts 118 and 119 are mounted with their respective left ends in the carriage wall 38a and their respective right ends in the carriage wall 38b. A spring 123 is curled around the shaft 119 and has one end fixed within the wall 38a and its other end fixed in the member 121 thereby biasing the latter in a clockwise direction (as seen by the reader in FIG. 7). This insures that the cam-follower roller 130 (located toward its lower end) will engage the edge of the cam 125. The opposite jaw-actuating member 120 has a spring 122 wound around the shaft 118, having one end anchored in the member 120 and the other end within an aperture in the carriage wall 38b. Spring 122 biases the member 120 in a counter-clockwise direction so that its corresponding cam follower roller 131 engages the edge of another cam 126 which rotates in unison with the cam 125 in response to the rotation of the shaft 53.

Figure 9:
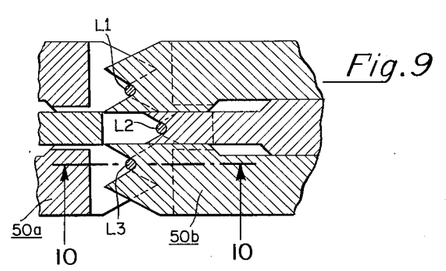
FIGURE 9 is an enlargement of part of the apparatus illustrated in the broken-line square in FIG. 8.

As shown in FIG. 6 (lower carriage position) the cams 125 and 126 are in positions such that the top parts of members 120 and 121 are urged away from one another and since they are respectively coupled to jaws 50a and 50b, the latter are not in their lead-engaging position. With the cams 125 and 126 in FIG. 7 in their respective positions (highest carriage position), the tops of the members 120 and 121 are at their inmost position thereby causing the jaw members 50a and 50b to grip the leads of the transformer as shown in FIG. 7, or in enlarged view in FIGS. 8 and 9.

It will be seen that the jaws 50a and 50b are mounted for axial movement within channels provided in the mounting blocks 134 and 135 which are fixedly mounted on opposing sides between the walls 38a and 38b of the carriage 38. It will be noted that the jaw member 50a is somewhat higher than the jaw member 50b.

The jaw members 50a and 50b have respective shafts 138 and 140 disposed transversely through transverse aligned apertures located near their rear portions. Pairs of springs 139 and 141 respectively connect the shafts 138 and 140 to the respective top portions of the members 120 and 121 where they are affixed to projecting side bolts 143 and 145 respectively. With this connection, it may be seen that the slight arcuate movement of the top parts of members 120 and 121 is translated by the springs, on the outstroke, to substantially rectilinear motion of the jaws 50a and 50b.

There are also disposed between the top inner portions of the jaw actuating members 120 and 121 and the rear surfaces of jaws 50a and 50b, respective resilient members 147 and 149. The lower flat parts of members 147 and 149 are screwed to respective inner surfaces of the top portions of the actuators 120 and 121. The upper parts of members 147 and 149 curve inwardly toward one another and bear against the respective rear portions of the jaws 50a and 50b. A plurality of adjusting screws 150 and 151 pass through threaded apertures in the upper portions of the jaw actuators 120 and 121 respectively and engage the inner concave surface of the top portions of the resilient members 147 and 149. It has been found that this method of coupling of the members 120 and 121 to drive the jaws 50a and 50b inward works extremely well, because the pivotal movement of the members 120 and 121 enables the convex surfaces of resilient members 147 and 149 to "wipe" the rear portions of the jaw members 50a and 50b as they move toward one another thereby to translate the curved driving motion to essentially rectilinear motion of the jaws. It will be remembered that when the jaws 50a and 50b do grasp the leads, it is when the carriage 38 is at its uppermost position (FIG. 7) and follows after the comb 40, as shown, has just cleared the bottom of the jaws 50b in the course of its downward motion.

Figure 10:
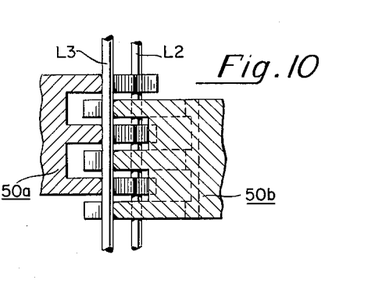
FIGURE 10 is a sectional view of the straightening jaws taken along the section line 10—10 of FIG. 9 in the direction of the associated arrows.

It will be noted that when the jaws 50a and 50b come together to grasp the leads, they intermesh as shown in FIG. 10. Also, when the transistor leads are to be arranged substantially at the apices of an imaginary triangle, as shown in the arrangement in FIG. 9, the middle toothed portions of the members 50a and 50b have complementary characteristics, i.e., whereas the middle toothed member of the jaws 50a protrudes furthest, the middle member of the opposite jaws 50b is set back the most. The jaw members 50a and 50b are so made that spaces 43 are provided between the middle toothed members and the outer toothed members which flank them. By this construction, both sets of jaws may be made identical, the only difference being that the middle member of one protrudes, whereas the other middle member may be set behind the members which flank it.

*Pre-straightener subassembly*

Figure 15:
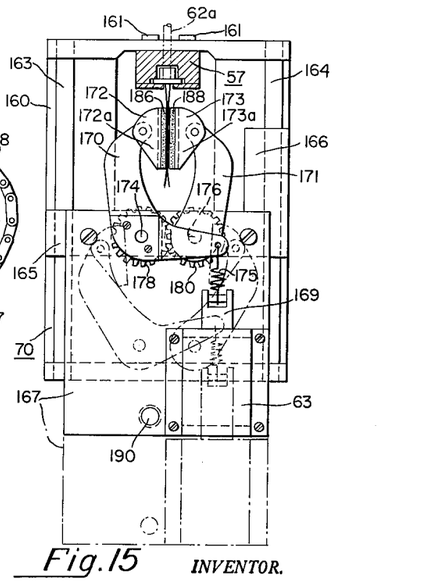
FIGURE 15 is a partly sectional, front elevation view of the pre-straightener taken along the line 15—15 in FIG. 1.
Figure 16:
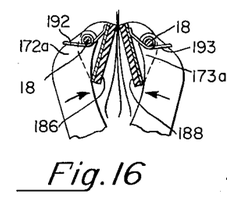
FIGURE 16 is a partly sectional enlarged view of the pre-straightening arms of the apparatus shown in FIG. 15.
Figure 17:
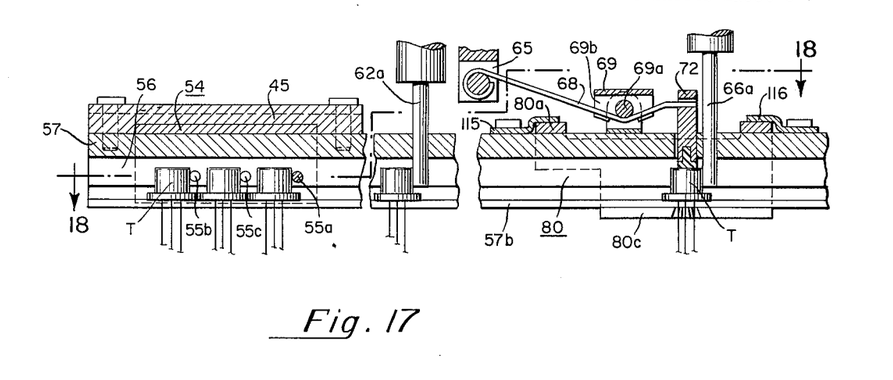
FIGURE 17 is a sectional view of the transistor feed channel and associated apparatus taken along the section line 17—17 of FIG. 6 in the direction indicated by the associated arrows.
Figure 18:
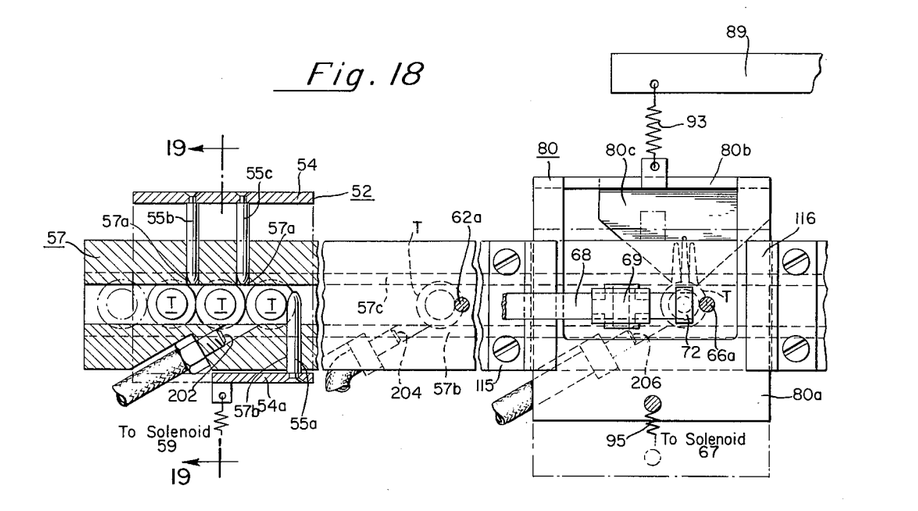
FIGURE 18 is a partly sectional and partial plan view of the transistor feed channel and associated apparatus taken along the line 18—18 of FIG. 17 in the direction indicated by the arrows.

The operation of the pre-straightener assembly 70 will now be considered with especial reference to FIGS. 1, 15 and 16. The assembly 70 is suspended from a yoke assembly 160 which extends over the top of the channel 57 and is affixed thereto by appropriate fasteners indicated generally at the numeral 161. Connected to the top of the yoke 160 are two columns 163 and 164 which are fastened also to the inner lower surface of the yoke 160. A pair of apertured sliding blocks 165 and 166 are mounted to the supporting plate 167 and arranged to slide up and down the columns 163 and 164 respectively. On the supporting plate 167 is mounted a solenoid 63 having an actuating armature arm 169. Also mounted on the supporting plate 167 are two pivoting gripping arms 170 and 171 having pivoting heads 172 and 173, respectively. The arms 170 and 171 are mounted on pivot pins 174 and 176 which are disposed perpendicularly to the mounting plate 167. The arms 170 and 171 have respective gears 178 and 180 screwed thereto as shown. The gears 178 and 180 have respective central apertures which are slightly bigger than the pins 174 and 176 to permit the gear 178 and its associated arm 170, as well as the gear 180 and its associated arm 171 to rotate freely.

As the solenoid 63 is actuated, it pulls the arm 169 downward causing the spring 175 attached thereto to move the arm 170 in a clockwise direction thereby, via the meshing of the gears 178 and 180, causing the arm 171 to pivot in a counterclockwise direction. As a result, the arms 170 and 171 are brought closer to one another and the pivoting heads 172 and 173 clamp the leads between them. The heads 172 and 173 have respective pairs of flanged ear portions 172a and 173a which have respective coaxial apertures therein through which pins 182 and 184 are passed to keep the heads 172a and 173a fastened to their respective arms. Affixed to each of the heads 172a and 173a are pads 186 and 188 which are made of a resilient substance such as a pebble-surfaced rubber material.

It will be noted that there is a shaft 190 (see also FIGS. 1 and 3) which connects the plate 167 to the carriage wall 38a via a slot 41 (FIG. 3) in the housing wall 23a. This shaft 190 causes the pre-straightener assembly 70 to be raised and lowered in unison with the carriage 38. When the carriage approaches its topmost position the arms 170 and 171 are in the position shown in phantom in FIG. 15 and the armature arm 169 is in its outermost position. At the top, the solenoid 63 is actuated pulling down the arm 169 thereby causing the arm 170 to be revolved in a clockwise movement which impels the arm 171 to move counterclockwise. It will be noted that the heads 172 and 173 are biased by springs 192 and 193 so that the tips of the lower portions of the pads 186 and 188 normally touch the inner curved surface of the arms 170 and 171 respectively. Consequently, when the solenoid 63 is actuated at the top position of the pre-straightener assembly 70, the top edges of the pads 186 and 188 first come together and pinch the uppermost portions of the leads. If the pads come together flat, the turned-up edges of the leads, shown in phantom in FIG. 6, might be folded back on themselves. By having the top edges engage first, the leads are pressed together somewhat so that their free ends tend to be lower and closer to one another before the remainder of the surfaces of pads 186 and 188 come together as shown in FIG. 15. They maintain this close face-to-face position while the assembly 70 is moved downwards by the action of the carriage 38. Even when closed the springs 192 and 193 are arranged to exert more pressure at the top of pads 186 and 188 than at the bottom so as to allow the top pebbled surface to act as channels thereby pulling the leads closer together so that the full surfaces of pads 186 and 188 can come into play.

*First feed arrest point*

Figure 19:
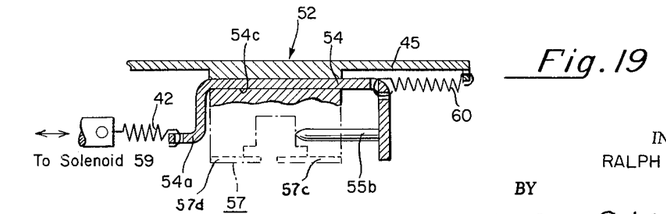
FIGURE 19 is a sectional view of part of the apparatus shown in FIG. 18 taken along the line 19—19 in the direction indicated by the associated arrows.

As stated previously, the transistors whose leads are to be straightened are originally inserted into the centrifugal feeder 58. The transistors thereafter are fed from the feeder down the inner channel 56 of the channel member 57. They first come to a one-by-one feed subassembly 52 (FIGS. 1, 17 and 18 and 19) which consists of a bent plate member 54 having a substantially U-shaped lengthwise cross-section. Plate 54 has its lower horizontal surface 54c resting atop channel member 57. It also contains a number of tapered pins 55a, 55b and 55c mounted in the inner surfaces of its downwardly extending portions 54a and 54b. These pins point toward the longitudinal axis of the channel 56. The pins 55b and 55c pass through appropriate holes 57a in one side of the channel member 57, whereas the pin 55a passes through hole 57b in the other side of member 57. The plate 54 is maintained in vertical position by a top plate 45 which is affixed by bolts or other appropriate fasteners to the top of channel member 57. The top plate 45 also anchors one end of a spring 60 (FIG. 19) whose other end is fastened to an aperture in the portion 54b to bias the member 54 generally to the right (as seen in FIG. 19).

When the solenoid 59 is actuated, its armature pulls the member 54 via the spring 42 toward the solenoid 59 thereby withdrawing the pin 55a from the channel so that the transistor previously abutting it can move down to the second arrest point which is above the pre-straightener 70. Simultaneously, the pins 55b and 55c are introduced into the channel which thereupon trap one transistor between them. At the same time that the member 54 is moved transversely of the channel structure 57 toward solenoid 59, a solenoid 64 is actuated by one of the switches 46 associated with a particular one of the cams 44. This opens a valve 208 which permits compressed air from source 210 to escape via nozzle 202 and exert pressure against the transistor formerly abutting the pin 55a to speed its travel down to the second arrest point. Upon de-energization of the solenoid 59, the pin 55a is urged once more into the channel 56 because of the tension exerted by this spring 60, and the pins 55b and 55c are withdrawn. Thus the transistor momentarily trapped by the pins 55b and 55c is released and slides down against reinserted pin 55a where it remains until the next time solenoid 59 is energized. All transistors in the channel 56 above the one abutting pin 55a slide down against the latter one.

*Second arrest point*

After the solenoid 59 is actuated, another solenoid 62 (FIGS. 17 and 18) fastened to a bracket 71 which is mounted on the topside of the channel member 57 is also actuated. This causes the armature pin 62a to enter the channel 56 through an aperture in the top of the member 57 thereby stopping the single transistor which has just been released by withdrawal of the pin 55a of subassembly 52. When this transistor has come to rest against the armature pin 62a, the pre-straightener assembly 70 has just reached its top position (FIG. 15). Upon actuation of the solenoid 63, the tops of the pads 186 and 188 first grasps the leads very close to the bottom of the transistor (FIG. 16) and then the pads press against one another as shown in FIG. 15 while the downward movement of the assembly 70 occurs. At the completion of the pre-straightening operation, the solenoid 62 is again energized which causes the pin 62a to move out of the channel 56. The pre-straightened transistor can then slide downward to the third arrest point. A stream of air from an air nozzle 204, which is released by opening of the valve 64 upon actuation of the solenoid 64, accelerates the descent of the transistor.

*Third arrest point*

The transistor just released by upward movement of the pin 62a proceeds down the channel 56 until it is stopped by an armature pin 66a (FIGS. 17 and 18) which extends downward through an aperture in the channel member 57. Once the transistor has been stopped, the solenoid 65 is actuated so that its armature 65a is pulled upward. Attached to the armature 65a is a bent lever member 68 which passes through openings in a pivoting fulcrum member 69 which has a fulcrum pin 69a which passes through aligned apertures in its side walls 69b. The ends of the pin 69a are lodged in upstanding portions of the U-sectioned member 69c. The end of the lever member 68 passes into an aperture in a rectangular pin 72 which passes through an aperture in the top of member 57. Thus, the right end of the member 68 is urged downward when the armature 65a is pulled up by the solenoid 65. The bottom of the pin 72 bears down on the top of the transistor and miantains it immobile during the interval that the separating, aligning and drawing operations are being accomplished.

*Separating subassembly*

While the transistor is being held in position by the pin 72, the solenoid 67 is actuated to cause the separating member 80 to move laterally (FIGS. 6, 7, 11, 17 and 18).

As a result the pointed wedge-shaped portions 80c of member 80 come between the leads and force them into the grooves 81, 84 and 87 (FIG. 12). It is advisable for the outer edges 80d and 80e to also be swept back (FIGS. 11 and 13) as this helps to keep the next transistor from interfering with the operation of the member 80 if it prematurely arrives at the third arrest point. It is important for the separator 80 to come very close to the transistor body because if the leads of the transistor are extremely twisted, the only place that they will be predictably spaced is extremely close to the point whence they emanate from the bottom of the transistor. Moreover, unless the separator 80 can and does work, the action of the comb 40 will be ineffective or faulty.

The member 80 has a top portion 80a which rides on top of the channel member 57 and is constrained in its lateral movement by brackets 86 and 87 which are bolted to the top of the structure 57. It has a vertical portion 80b which is connected by a spring 93 to a fixed mounting structure 89. The separating, wedge-shaped part 80 is a lower horizontal extension of the vertical portion 80b.

When the solenoid 67 is energized, its armature 67a is pulled inward thereby increasing the tension on the spring 95 which is attached to a post on portion 80a. Consequently, the assembly 80 moves toward solenoid 67 against the tension exerted by the spring 93. After the separating step has been accomplished, the solenoid 67 is de-energized, the armature 67a moves out once again and the spring 93 pulls the assembly 80 back toward the stationary member 89.

*Recapitulation of operation*

Transistors are fed into the channel 56 from the feeder 58. They slide down under the influence of gravity until they are stopped by the pins 55a, 55b, and 55c. The motor 24 causes the shaft 25 to rotate, which, in turn, causes the shaft 31 to rotate because of the chain 29. The cams 44 on shaft 31, in conjunction with the switches 46, operate all the electrical components of the machine. One of the cams and its associated switch causes the solenoid 59 of assembly 52 to release one transistor at a time down the channel 56 under the influence of air from the nozzle 202. All of the air nozzles are attached to a common valve 208 which is operated by a solenoid 64 in response to a predetermined one of the cam-switch combinations.

As the transistors, one by one, are released, they slide down the channel 56 until they are stopped by armature pin 62a. At this juncture, the pre-straightener mechanism 70 which is connected to the carriage 38 grasps the twisted leads of the arrested transistor between its pads 186 and 188 and when the carriage 38 is lowered, presses the leads into substantially the same plane.

Further rotation of the cams 44 eventually causes the solenoid armature pin 62a to be lifted thereby permitting the pre-straightened transistor to proceed under the influence of a jet of air from nozzle 204, to the next processing station.

The next processing station is the region in which the lead separating, aligning and drawing (or straightening) operations are performed. The pre-straightened transistor is stopped by the armature pin 66a of the solenoid 66 and shortly thereafter the pin 72 clamps down against the top of the transistor in response to energization of the solenoid 65. As soon as the transistor is thus immobilized, the separating member 80c slides under the channel member 57 very close to the bottom of the transistor. The pointed wedge-shaped portions of 80c penetrate between the transistor leads forcing them to enter the grooves 81, 84 and 87.

During this time, the carriage 38 has been rising because of the action of disc 35 and the rigid connecting rod 36 when the shaft 31 is rotated. As the carriage 38 is being lifted, the comb 40 is moving into position to engage the leads of the transistor at a point extremely close to the bottom of the bottom of the separator member 80c. When it does, it moves in a curved path until it engages the leads in its grooves 212, 214 and 216 and then, in response to the movement of the rigid member 100, moves downward quickly out of the way of the jaw members 50a and 50b which are just coming together in intermeshed fashion. The jaws 50a and 50b are urged together by angled arms 120 and 121 in response to the cams 125 and 126. Then the whole carriage 38 is moved down while the comb 40 is aligning the leads followed by jaws 50a and 50b which are straightening the aligned leads.

When this straightening operation has been completed, the pin 72 is lifted by solenoid 65, the pin 66a is lifted by solenoid 66 and a jet of air from the nozzle 206 pushes the processed transistor further down the channel 56 where it may be collected or subjected to further processing steps if desired.

While the steps above have been described as operations, in series, on a single transistor, it should be remembered that the pre-straightening and the separating, aligning and main straightening steps may be performed simultaneously on two different transistors.

It should also be noted that in the case of certain types of transistors such as the TL5 type shown in FIG. 11, the strips 57c and 57d (FIGS. 6, 15, and 19) have respectively different widths so that the spacing between their inner edges is not symmetrical with respect to the longitudinal axes of the chute 56. This is done purposely to orient the transistors so that the upper regions of their two leads L1 and L3 (FIG. 11) lie initially in substantially the same plane which is parallel to the longitudinal axes of the chute and so that throughout the remainder of the processing steps they remain so oriented. Of course, other general types of transistors may require different orientation so that the chute structure would be modified accordingly.

In the embodiment shown, the comb 40 came very close to the bottom surface of the member 80 as the former engaged the leads. Basically, there is no reason why the comb 40 could not enter in the spaces between the leads in which the teeth of the separator 80 entered if the separator were so constructed and arranged as to be retracted before the comb 40 engages the leads. The action of the comb 40 as described herein has proved highly satisfactory since there will always be spaces between the leads, even below the lower surface of the separator 80, which are produced by the action of the latter.

The separator 80 has been pictured as comprising a single laterally moving member with wedge-shaped teeth. The particular construction of the separator 80, however, may take a number of alternative forms as its function is primarily to ensure that there are spaces between the leads in the region where the comb 40 first engages the leads. Thus, a number of laterally projecting tapered pins might be used, for example, instead of the structure shown in FIG. 11.

The particular shapes and disposition of the cams 44 has not been illustrated, nor have the wiring details associated with the switches 46 that are actuated by the cams 44 and the various solenoids shown in FIG. 1. These are obvious to one skilled in the art and will depend upon factors which do not directly concern the present invention and would only serve to confuse the description thereof.

Other modifications and alternative constructions will be evident to those skilled in the art upon reading of this application and hence I desire my invention to be limited only by the following claims.

I claim:

1. Apparatus for arranging yieldable elongated members which extend from a given body, comprising:
    (a) means for causing said members to lie substantially in the same plane,
    (b) means for separating said members which lie substantially in the same plane from one another in the region thereof adjacent to said body,
    (c) means for separating said members from one another throughout the substantial remainders of their respective lengths, and
    (d) means for straightening said members throughout substantially their entire lengths.

2. The apparatus according to claim 1 wherein said means for causing said members to lie substantially in the same plane is also constructed and arranged to straighten said members to a predetermined extent.

3. Apparatus for arranging yieldable elongated members which extend from a given body, comprising:
    (a) means for straightening said members to a predetermined extent, said means comprising resilient members for pressing said elongated members into substantially a single plane,
    (b) means for separating said elongated members from one another in the region thereof adjacent to said body,
    (c) means for separating said elongated members from one another throughout substantially the remainders of their respective lengths, and
    (d) means for engaging said members throughout substantially their entire lengths for straightening said members, selected ones of said (b), (c) and (d) means also being constructed to arrange selected portions of the respective axes of said members in predetermined positions.

4. Apparatus for arranging yieldable elongated members which extend generally similarly from a given body, comprising:
    (a) a pair of pressing means which press said yieldable members into substantially a single plane, said pressing means having substantially flat resilient textured surfaces which also act to straighten said members to a predetermined extent,
    (b) wedge means for separating said elongated members from one another in the region thereof adjacent to the points where they extend from said body,
    (c) means introduced between said elongated members in said region and having lower tapered edges for separating and aligning said elongated members throughout substantially their entire length, and
    (d) gripping means for engaging successive portions of said elongated members thereby to straighten them in the region of the points of engagement.

5. Apparatus for arranging yieldable elongated members which extend generally similarly from a given body, comprising:
    (a) means for pressing said elongated members into substantially a single plane, said pressing means being constructed and arranged first to move substantially transversely to said elongated members and to engage them near the region adjacent to the points where they extend from said body, and then to move in the direction in which said elongated members generally extend to effect pressing of said members throughout their lengths, said pressing means including a pair of substantially flat resilient surfaces which straighten said members to a predetermined extent,
    (b) wedge means for separating said elongated members after the action of said pressing means in said region, said wedge means being constructed and arranged to move transversely to the general direction in which said members extend,
    (c) means introduced between said members in said region and having lower tapered edges for separating and aligning said members throughout substantially their entire lengths, said separating and aligning means being constructed and arranged to move predominantly in the same direction as that in which said members extend, and
    (d) gripping means for engaging successive portions of said members thereby to straighten them in the region of the points of engagement therewith, said gripping means being constructed and arranged first to move transversely to said general direction to engage said members and then to move in said general direction to effect straightening thereof.

6. Apparatus for arranging yieldable elongated members which extend generally similarly from a given body, comprising:
  (a) wedge means for separating said members from one another in the region thereof adjacent to the points where they extend from said body, said wedge means being constructed and arranged to move transversely to the general direction in which said elongated members extend,
  (b) means introduced between said members in said region and having lower tapered edges for separating and aligning said members throughout substantially their entire lengths, said separating and aligning means being constructed and arranged to move predominantly in the same direction as that in which said members extend, and
  (c) gripping means for engaging successive portions of said members thereby to straighten them in the region of the points of engagement therewith, said gripping means being constructed and arranged first to move transversely to said general direction to engage said members and then to move in said general direction to effect straightening of said members, said gripping means comprising a plurality of means which engage said elongated members from opposing sides thereof, said separating and aligning means being arranged to move in said general direction just ahead of said gripping means.

7. Apparatus for arranging the leads of electronic devices comprising:
  (a) wedge means for separating said leads from one another in the region thereof where they are attached to said device, said (a) means having lower tapered edges and arranged to move between said leads in a direction transverse to the general direction in which said leads extend,
  (b) a pivoting, comb-like member having a plurality of wedge-shaped teeth which pass between said leads in said region, said teeth having lower tapered edges, said comb-like member being arranged thereupon to move away from said device in the general direction in which said leads extend, and,
  (c) first and second pluralities of straightening jaw members which engage said leads from opposite sides thereof and then are moved away from said device in the general direction in which said leads extend, said first and second pluralities being disposed in said general direction so as to intermesh when engaging said leads, said jaw members having indentations against which said leads bear.

References Cited by the Examiner
UNITED STATES PATENTS

| | | | |
|---|---|---|---|
| 3,013,590 | 12/1961 | Pechy | 140—71.6 XR |
| 3,069,749 | 12/1962 | Gartner | 140—71.6 XR |
| 3,071,166 | 1/1963 | Gutbier | 140—147 |
| 3,073,446 | 1/1963 | Wilson et al. | 140—147 |

CHARLES W. LANHAM, *Primary Examiner.*
WILLIAM F. PURDY, *Examiner.*